June 12, 1934.　　　E. P. DUNN　　　1,962,270
SLAG TREATMENT AND APPARATUS THEREFOR
Filed Feb. 19, 1931
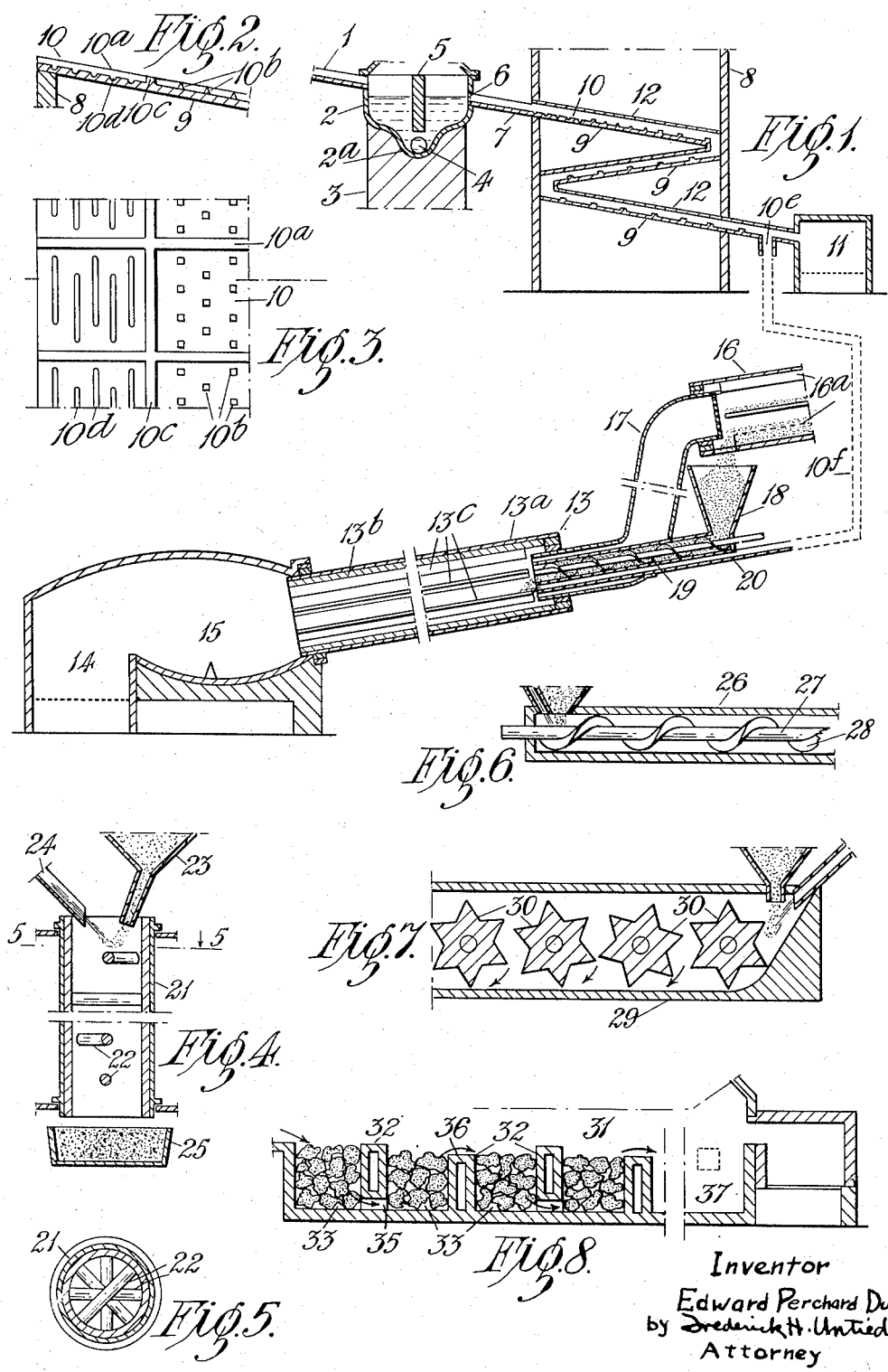
Inventor
Edward Perchard Dunn
by Frederick H. Untiedt
Attorney

Patented June 12, 1934

1,962,270

UNITED STATES PATENT OFFICE

1,962,270

SLAG TREATMENT AND APPARATUS THEREFOR

Edward Perchard Dunn, Ferny Creek, Victoria, Australia

Application February 19, 1931, Serial No. 517,041
In Australia March 8, 1930

6 Claims.  (Cl. 49—77.5)

An object of my process is to produce, from smelter and other slags, reliable and high class articles and constructional materials of various descriptions, including artificial stone or vitreous bricks, blocks, tiles and the like, paving materials, road metal, gravel and concrete aggregates, and materials for use in marine works, electric insulating material, articles of artificial stoneware, posts, domestic utensils, and other products of general utility, but this invention is applicable to the manufacture of slag products other than those specifically mentioned.

By "slag" I mean primarily iron blast furnace slag, but other slags, such as copper and lead slags, may be utilized. In addition molten silicates having a similar constitution to true "slag", and technically equivalent thereto, though not formed as by-products in a metal smelting or refining process, are utilizable.

Certain main requirements must be fulfilled to produce satisfactory materials. The resultant materials must be chemically stable, that is, must not be liable to distintegration and must be able to resist corrosion by weather, or by sea or mineral water or chemicals. They must also be physically stable, that is, able to withstand considerable crushing, tensile, transverse and shearing stresses and stresses due to unequal expansion from heat and cold, and from shock. These properties depend largely upon the chemical composition of the material, though other factors play a considerable part, such as the method of annealing.

It is also desirable that there shall be a certain standard of uniformity in the quality and composition of the products of each works, or group of works, as is the case with many common commodities. It would then be known what the characteristics of the products were and what could be expected from them. The products also should in appearance be reasonably attractive. In the aforementioned points, unaltered slag, generally speaking, falls short.

In certain cases slag which has had no important alteration made in its composition is usable if sufficiently pure (and it may be purified in the manner I will describe) but in many cases an alteration in composition is desirable. It is therefore generally my object to alter the composition and nature of the slag so as to fill the said requirements. A first step in certain cases will be the removal of impurities especially compounds of sulphur. The alteration in composition can be somewhat indefinite, and non-uniform, or comparatively definite and uniform, as I explain hereinafter.

I will now explain the alteration in the composition of the slag I consider desirable.

In iron blast furnace slag generally one equivalent of silica is united with one equivalent of the bases and alumina, silica being the acid. Other slags (as copper or lead) have a generally similar constitution to iron blast furnace slag, except that the various bases may be in considerably different proportion, for example there may be much iron and comparatively little lime, and at times much ZnO or BaO may be present.

Slags occasionally have a larger proportion of silica, that is are more "acid" than the more ordinary slags. In glass we have a material analogous to slag in composition and mode of formation, composed of several equivalents of silica united with one equivalent of the bases, including the alkalies and alumina, the latter not being usually present in large quantity.

Long experience has shown that in glass a very high percentage of silica, or standard of acidity, say up to 75% $SiO_2$, is desirable. This ensures that the bases are tenaciously held, and the material is extremely stable and strong. (When alumina replaces part of the basic constituents the acidity is—in my view—thereby increased, since alumina is an undecided substance chemically, that is, it is sometimes acid and sometimes basic in its behaviour, combining with either silica or bases.) Similary, I improve the qualities of the slag by a considerable increase in its acidity or percentage of silica when the percentage of silica in the slag is not originally high.

Silica in its various forms and combinations is universally common and abundant and inexpensive.

Other substances—the "bases" (including the alkalies) generally, but also substances not decidedly basic, such as alumina and ferric oxide— and boric, phosphoric, or titanic acid—exert an important effect upon the qualites of silicate products: and when such are not present in sufficient amount I would in some cases add them to the molten slag.

Slags (other than iron blast furnace slags) may often contain considerable FeO, BaO, ZnO and so on. All added materials should be reasonably free from impurities, which may consist of sulphides and sulphates, iron oxides, carbonates, organic and carbonaceous material, and so forth.

The amount of silica or other substances that may be combined with the molten slag, will be affected by such technical and economic considerations as the cost of labour, fuel and materials required for such combination, and the simplicity and facility of operations. These factors will also be affected by the situation of the smelters, (conditions varying considerably in different localities) and the particular products and articles to be made.

Generally I would increase the proportions of silica in the molten slag to the maximum technically possible and advantageous and economically profitable, and I would in suitable cases add other substances than silica to produce desired effects. Whilst this is an objective with me, my appliances are available for the production of materials in which the percentage of silica is little increased or not at all.

A further modification that may be made consists in the mechanical incorporation or admixture of sand or other materials (small sized or finely divided) with the slag. I have explained in a general way the chemical and other composition of products aimed at, this composition varying with the nature of the articles to be produced, and I will now describe how I produce the articles and materials above enumerated from raw slag.

By my preferred method the slag is taken direct from the blast or other furnace in order to conserve the sensible heat contained in it and to avoid rehandling and remelting costs; but when it is desired to use slag which has solidified it will be remelted in a suitable, for example a cupola, furnace, with or without additions of fresh materials to alter its chemical composition,—preferably without material contact between the materials to be melted and solid fuel, in order to avoid any addition of impurities into the molten materials.

When the slag treatment works is at a material distance from the smelters the molten slag is to be conveyed thereto suitably,—for example in covered slag cars or trucks (comparatively large receptacles will minimize loss of heat during transit).

The molten slag, in either case, is received in a vessel suitable in size and form, for settling the slag, and to allow of equalizing the supply and composition of slag in subsequent operations.

This vessel, in some respects, resembles a known metal mixer as used in iron and steel works, and it is when appropriate heated in order to maintain the temperature of the slag. The surface of the molten slag in the vessel can be skimmed at intervals when suitable to remove floating impurities, such as fragments of coke; and metallic particles (of iron, for example) in the slag can, upon settling, be tapped off. To allow slag to be drawn off in a regular stream an iron dam plate is provided having in it outlets of varying sizes. An essential step is to remove from the raw slag any impurities which would subsequently prove injurious or may detrimentally affect the quality of the finished product or constitute a source of danger to it. One important impurity is in some cases (in iron blast furnace slags especially) sulphides of the base or other metals. It is generally accepted that the S in iron blast furnace slags exists chiefly as sulphide of calcium.

Owing to the intense reducing atmosphere of the iron blast furnace, conditions are favourable to the presence of sulphides, sulphates being reduced to sulphide by C and reducing gases at a high temperature.

The amount of sulphur in iron blast furnace slags varies considerably. It may be under 1% or as high as 3.5% or higher. Were all the S in the latter instance present as CaS, the latter would amount to about eight per cent. Calcium sulphide (or practically any sulphide) is unstable when exposed to the moisture and O and $CO_2$ of the atmosphere. It is decomposed and lime and sulphur compounds especially hydrogen sulphide are formed which are corrosive and objectionable substances. There is danger of their disintegration when articles containing sulphides are exposed to the atmosphere or to sea or mineral water or chemicals, even when the amount of CaS present is only one or two per cent. I remove or reduce therefore, at an early stage, this impurity (when present), unless it will be got rid of during subsequent manufacture, or unless the amount in the finished product would be so small as not to constitute a source of injury or danger.

I effect the said purification when necessary by exposing the molten slag to the action of an oxidizing atmosphere in a suitable furnace or appliance. If carbon compounds, such as carbides or cyano compounds are present, they may also become oxidized. In addition $CaSO_4$ or other sulphate may be present in the original slag or may be formed in injurious quantity during the oxidation of sulphides and so pass into the finished products; this I would remove by subjecting the molten slag to the action of carbonaceous material in a furnace. This action is used in the manufacture of glass, sodium sulphate being decomposed by carbonaceous material.

Sulphates are liable to be leached out and may otherwise cause disintegration.

Each 1% sulphur in the finished product represents 2¼% CaS or 4% of $CaSO_4$, the S or $SO_4$ being assumed to be combined with calcium.

When solidified slag is remelted (with or without the incorporation of fresh materials) a great part of the sulphide present may be oxidized.

Generally stated, when any sulphides or sulphates in molten slag are not (or cannot easily be) eliminated during a subsequent process of manufacture of and would pass in injurious quantity into, finished products, it is a part of my process to remove them by a preliminary treatment.

I next describe how slags, which may have been purified, are treated to alter their chemical composition. It should be premised that those methods and apparatus also combinations of various methods and apparatus found most suitable to any given circumstances by experience are to be used.

One manner (which however yields an indefinite and non-uniform product) in which alteration of the chemical composition of slag can be effected is by adding, with or without the use of a mixing apparatus, more or less finely divided, and more or less preheated, solid ingredients to the molten slag just before or during the process of moulding or forming articles from the molten material, and subsequent annealing assists chemical combination.

By "molten" I mean in any state from complete fusion to semi-fusion or plasticity. Fine division of added materials expedites the process of chemical combination. Preheating expels moisture and other volatilizable matter and raises the temperature of the solid materials to any desired extent and can be performed in any convenient manner.

In some instances and to some extent superheating the slag is an alternative to preheating of the solid materials. The additions can be made in any manner as described later with reference to mechanical incorporation or admixture. In another case to produce a definite and uniform alteration in the composition of the molten slag, it will be necessary to allow sufficient time for the combustion, and in such case I mix the slag and materials in suitable appliances.

The products after the alteration in chemical composition may be used direct. Or they may be further modified, and formed into desired articles, this modification consisting in the mechanical incorporation or admixture or cementation of sand ($SiO_2$) or other materials, more or less finely divided, say from gravel size downwards as may be found practicable and advantageous under the given circumstances, and more or less preheated. The preheating drives off moisture and other volatilizable matter and raises the temperature of the materials to any desired extent. Any molten slag (or silicates), whether from a blast or other furnace, may have additions mechanically incorporated. The slag may or may not have been purified, and may or may not have had its chemical composition altered. When sand ($SiO_2$) is added, there will be some amount of chemical combination with the molten silicates in addition to the mechanical admixture, and this is true of some other materials. Temperatures, and the method of annealing, and the fineness of materials and the period of contact between the molten slag and solid materials affect the extent of chemical combination.

With sand there is no sharp division between chemical combination and mechanical admixture, but the coarser that material the less will be its chemical combination.

It will be in some cases advantageous to combine chemical combination and mechanical admixture of materials with the slag.

The said combination and admixture occur in altering the chemical composition of the slag as previously described, by addition of more or less finely divided and more or less preheated materials to the slag, with or without the use of a mixing apparatus, just before or during moulding and subsequent annealing.

These results of combined chemical and mechanical admixture may also be secured in the rotating mixing cylinder which is described with reference to the part marked 13, in Fig. 1, the slag in this case being altered to a fairly definite and uniform composition. Especially in the case of sand, when materials are being chemically combined with the slag in such an apparatus, it is possible to allow a more or less considerable proportion of the addition to remain undissolved and mechanically admixed. For the admixture I employ thoroughly dry additions, free from much S as sulphides or sulphates, and from what would yield gas or vapor which during moulding of articles would result in bubbles or holes in the product. These additions should not be easily fusible, nor be too prone to combine chemically with the molten material, when a merely mechanical admixture is required.

The use of such materials, especially sand, is important, as their merely mechanical incorporation with molten silicates confers upon the product advantages by improving its appearance, for example by subduing the vitreous appearance and diminishing the slipperiness of surface, such being expected to be economically profitable.

I propose also in some cases to utilize the slag essentially as a binding agent or cement for comparatively small sized materials (as already defined) in order to form a sort of concrete.

This mechanical incorporation of more or less finely divided material may be carried out by injecting it or adding it to the slag just before or while flowing into the moulds, or by sprinkling it manually or mechanically on the surface of the moulds simultaneously with the running in of molten material to form a more or less uniform admixture.

When the materials in the latter case are not too greatly preheated a chilling of the molten slag will be effected, causing it to set rapidly and uniformly. I will also effect the mixing of molten slag and added solid materials in, for example a rotating cylinder as previously described, heated, as by flames, in some cases. I will also use any other convenient devices for mixing according to requirements of the product or other circumstances as stated later on.

The methods and apparatus most suitable in particular circumstances, can be determined according to those circumstances. Methods of moulding and annealing are of great importance; but moulding and annealing processes have already been considerably developed, and any suitable methods already proposed may be availed of.

The foregoing and further particulars of my process will now be described relatively to apparatus illustrated in the accompanying drawing, which is diagrammatic.

Figure 1 is an elevation showing in vertical section a plant including a desulphurizing furnace for slag treatment, and the production of materials according to my process.

Figures 2 and 3 are on a larger scale, Figure 2 being an elevation in longitudinal section of part of the desulphurizing furnace.

Figure 3 is a plan of the part in Figure 2.

Figure 4 is a vertical section of apparatus for mixing slag and added material.

Figure 5 is a plan on line 5 of Figure 4.

Figure 6 is a sectional view of a modified mixing mechanism having screw devices.

Figure 7 is a sectional view of a modified mixing mechanism having toothed rollers.

Figure 8 is a sectional view of part of a reverberatory furnace adapted for use in carrying out my process. 1 is a chute along which molten slag flows into a mixer 2 of any suitable shape and size, that shown being suitably supported on a brick or other foundation 3. The mixer base 2$^a$ tapers, and solid particles settle therein to be drawn off at one or more outlets 4. The mixer contains a baffle or baffles 5 which may be movable and which mix the slag as it travels to outlets or holes in a dam plate 6. The slag passes down a chute 7 to a desulphurizing furnace 8.

A suitable desulphurizing furnace for continuous operation is a reverberatory furnace, with an inclined bed or beds, which is or are divided into comparatively narrow channels by partitions to evenly and thinly distribute the slag stream over the inclined bed, the inclination ensuring flow of slag at a suitable rate. The length of furnace necessary in some cases for proper oxidation of sulphides may be considerable, and space is economized by using a vertical furnace and making the slag flow from one end to the other successively over a series of tiers 9 dropping from the end of each tier to the next.

Each tier is divided into channels or beds 10. Or the slag ways may be arranged side by side, the slag flowing in opposite directions alternately.

Any parts will when desirable be suitably enclosed in masonry (not shown) to conserve heat or the furnace might be left open when it is desired to obtain a cooling action on the bottom of the hearths, which are suitably supported. The channels or narrow beds 10 formed between partition ridges 10ª have projections as teeth 10ᵇ, and in some cases transverse riffles, as 10ᶜ and flutings or channels 10ᵈ or a combination of these, to break up the stream of slag, and expose as much slag as possible to the action of oxidizing gases or flames in the furnace—also to somewhat retard the flow of the slag and lengthen the period of oxidation. Teeth 10ᵇ are shown small but may be of any desired size and shape.

I cause a stream of oxidizing flame and air to pass over the slag in an upward direction by introducing at, for example, the outlet 10ᵉ from the lowest tier, oxidizing flame and gases, as for instance from a fire box 11, and causing said flame and air to traverse each tier, in close contact with the slag under a confining roof 12, which is close above each tier.

In Figure 1 the dotted connection 10ᶠ is merely diagrammatic to facilitate compact drawing—in practice it should be short, and preferably straight, extending between part 10ᵉ and trough 20 hereinafter mentioned. In some cases an oxidizing flame and gases can be introduced direct to the lower end of each or of any tier, a suitable heat being maintained.

The rotating cylinder 13 to be described, can in cases be used for desulphurizing (with modifications if necessary either for that alone or with the simultaneous combination of slag and solid materials).

After the slag is (when necessary as aforesaid) purified in the said furnace, for example, its chemical composition can be changed as desired, by the methods and apparatus I describe. For rough methods of chemical combinations, appliances and methods described with reference to mechanical admixture may be utilized.

For more accurate work a suitable appliance includes—see Figure 1—a rotating cylinder 13 made, for example, of a sheet iron shell 13ª lined with refractory material 13ᵇ. This cylinder is of any suitable diameter, and is revolved at any desired speed. It is in some cases inclined; the inclination may be adjustable. Or it may be approximately horizontal and furnished with helical ribs of refractory material to mix and move forward the contents. It contains along its length means as ribs 13ᶜ to lift and drop the contents under treatment.

In some cases I provide transverse or obliquely set ribs of refractory material to further retard the flow of the said contents along it. In place of ribs or in combination therewith the refractory lining may be furnished with teeth or projections for a like purpose. To heat this cylinder there is for instance a fire-box 14 beyond a receiving hearth 15; or the fire-box may connect directly with cylinder 13 and the hearth be underneath or at one side. Or the gaseous or like fuel and air may be led directly into the cylinder.

In some cases the contents of cylinder 13 are drawn off direct at its lower end. The solid materials fed in consist for example, of sand; and the fineness of such materials will obviously be varied with the circumstances. Cylinder 13 under favourable conditions is an efficient desulphurizer.

When the solids are added in large quantity, proportionately to the molten slag, they must be considerably preheated to avoid chilling and solidifying the slag.

I preheat the material in, for instance, a revolving cylinder 16 similar to but set higher than the mixing cylinder 13. I utilize waste gases from the mixing cylinder causing them to pass through a flue 17, but where necessary I can apply additional heat. Cylinder 16 contains longitudinal ridges 16ª to, during rotation, lift and drop the materials under treatment so that the heated gases pass through them. Other methods of preheating may be employed, especially for very finely divided dust-forming materials. From cylinder 16 the heated material discharges into a hopper 18 from which it is fed, at a suitable rate, by a conveyor 19, so that it discharges into cylinder 13 simultaneously with a stream of slag from a conductor, as a trough 20. I show (diagrammatically and not to scale) the conveyor 19 and trough 20 entering through part of the flue 17.

The rate at which solution of the added materials occurs in the molten slag will depend mainly upon the nature and fineness of the materials and upon the temperature; and the period during which the materials and molten slag are in contact and are mixed will, as herein set forth, depend upon the diameter, length, inclination, rate of rotation, and other arrangements of the cylinder, and the rate at which the slag and added materials are fed in.

This apparatus when worked continuously will allow of obtaining predetermined products having, to a substantial degree, accuracy and uniformity of chemical composition; but to obtain a closer degree of accuracy and uniformity I may use an intermittently rotating horizontal cylinder having means (as holes) for charging and discharging, these holes being closed during rotation; with this cylinder, the feed could be gradual or intermittent, whereas if a continuously working furnace (as illustrated) were used, two or more would need to be placed so as to work in conjunction (as in tandem) to permit of such intermittent feed.

The furnace next described is usable when for example suitably finely divided materials are not available, or preliminary pulverizing would not be convenient or when it is desirable to avoid the use of the machinery comprising apparatus described previously, the appliance being a simple gravitative one.

The solid materials added will be lumps, of any convenient size, of various rocks. Waste rock of suitable composition from mining operations could be utilized. I feed in easily fusible materials such as alkalies, preferably with the molten slag.

This furnace 31 is similar to a tank glass furnace but with, instead of one interior partition, several partitions, as 32, dividing the hearth into compartments 33 which I fill with the materials 34 in lumps. From the first compartment the fluid slag escapes at 35 below a partition base, and from the second compartment over a partition top at 36, and so on alternately. The material fed in is to be preferably preheated for which purpose the waste gases from the furnace can be utilized; as for example in a shaft. By regulating the flow of slag and the number of compartments a reasonably close approximation to uniformity in the composition of the product can be achieved. When the contents of the furnace attain the desired composition, and collect at its end 37, they are to be tapped off or otherwise removed. In these furnaces any desired substance as previously mentioned may be combined with the molten slag. Alkalies would probably be best fed in regularly with the slag. An apparatus usable for the mechanical admixture of slag and solid material (or for combined chemical and mechanical admixture) includes what is next described. I illustrate a vertical cylinder 21 or other suitably shaped tubular vessel, of comparatively small diameter, that may be used, having bars 22, which may be hollow and be cooled from within, or other suitable means. These bars are arranged as shown at different angles to one another to cause mixture of solid material from a hopper 23 and slag from a feed chute 24, and prevent too rapid passage. This cylinder may be heated by flames, and is to be rotated at suitable speed, and fed with molten slag and preheated solid materials simultaneously; and as they descend they are mixed and the mixture falls into moulds 25 placed below, or is otherwise formed into articles. In Figure 7 a narrow trough 29 contains a series of star or rib-section rollers 30, of earthenware or any material sufficiently resistant by its constitution or construction, to the heat and action of the material fed in. For instance, in this and the following apparatus, earthenware or stoneware might be solid, or hollow and air cooled, but if of metal it would be hollow inside to permit of the passage of a cooling agent—such as air or steam. In another form the cylinder or tube may be fixed as at 26, and have in the middle a revolving spindle 27 furnished with any suitable appliances for mixing, such as a screw 28 of any suitable pitch (endless or in sections), with or without projections to further mix the materials. In this case the cylinder or tube could be approximately horizontal if desired. Alternatively I may use a central fixed spindle with the enclosing cylinder rotatable. In some cases I can use tables with rollers on which the fine solid material is incorporated with plastic slag material. These tables may be like those used in the manufacture of plate glass. Or I can feed between rollers, or can place the solid matter on and press it into, moulded but still fused or plastic material.

Certain of these described methods and appliances can be used for other branches of slag utilization such as in making cement and slag wool.

In the claims the term "slag" includes molten silicates however formed or obtained, of similar constitution to true slag, but not produced as by-products in a metal smelting or refining process; and the term "molten" includes any state from complete fusion to semi-fusion, or a "plastic" condition.

I claim:—

1. The process of treating molten slag containing sulphur which includes the steps of removing impurities from the slag by settling, removing sulphur from the slag by causing the molten slag to flow as a moving stream in contact with an oxidizing flame and air, and incorporating solid aggregates in the thus purified slag.

2. The process of treating molten slag containing sulphur which includes the steps of running the slag into a receptacle, mixing it therein to homogenize it, removing impurities from the slag by settling, removing sulphur by causing the molten slag to flow as a moving stream in contact with an oxidizing flame and air, and incorporating solid aggregates in the thus purified slag.

3. The process as in claim 1 wherein the solid aggregate comprises sand to increase the combined silica content of the purified slag.

4. The process as in claim 2 wherein the solid aggregate is preheated before incorporation with the slag and the aggregate is in finely divided form.

5. Apparatus for the production of useful materials from silicious slags including a vessel adapted to contain molten slag, means to withdraw settlings in said slag from the bottom of said vessel, a furnace having a zig-zag passage, means to conduct molten slag from said vessel to said passage, means to introduce oxidizing gases into said furnace, a rotary mixing chamber having baffles therein to agitate the contents as the chamber is rotated, means to conduct slag from said furnace to said chamber, and means to introduce materials into said chamber in addition to the molten slag.

6. The apparatus as in claim 5 including means to preheat solid materials prior to the introduction thereof into the mixing chamber.

EDWARD PERCHARD DUNN.